US009483162B2

(12) United States Patent
Mingione

(10) Patent No.: US 9,483,162 B2
(45) Date of Patent: Nov. 1, 2016

(54) RELATIONSHIP VISUALIZATIONS

(71) Applicant: Palantir Technologies Inc., Palo Alto, CA (US)

(72) Inventor: Alessandro Mingione, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 298 days.

(21) Appl. No.: 14/320,236

(22) Filed: Jun. 30, 2014

(65) Prior Publication Data

US 2015/0234549 A1  Aug. 20, 2015

Related U.S. Application Data

(60) Provisional application No. 61/942,540, filed on Feb. 20, 2014.

(51) Int. Cl.
*G06F 3/0482* (2013.01)
*G06F 3/0488* (2013.01)
*G06F 3/0484* (2013.01)

(52) U.S. Cl.
CPC .......... *G06F 3/0482* (2013.01); *G06F 3/0488* (2013.01); *G06F 3/04842* (2013.01); *G06F 3/04847* (2013.01)

(58) Field of Classification Search
CPC ................................................ G06F 3/0482
USPC ........................................................ 715/739
See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,845,300 A | 12/1998 | Comer | |
| 6,057,757 A | 5/2000 | Arrowsmith et al. | |
| 6,091,956 A | 7/2000 | Hollenberg | |
| 6,161,098 A | 12/2000 | Wallman | |
| 6,219,053 B1 | 4/2001 | Tachibana et al. | |
| 6,232,971 B1 | 5/2001 | Haynes | |

(Continued)

FOREIGN PATENT DOCUMENTS

| | | |
|---|---|---|
| DE | 102014103482 | 9/2014 |
| DE | 102014215621 | 2/2015 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Reza Nabi

(74) *Attorney, Agent, or Firm* — Knobbe, Martens, Olson & Bear, LLP

(57) ABSTRACT

Systems and techniques for accelerating relationship visualizations from data objects are described herein. The configuration and/or display of a relationship matrix may be automatically determined from the data objects. The relationship matrix may display relationships through gradient, hue, color, and/or saturation. The relationship matrix may be navigable and/or interactive to accelerate relationship visualizations.

20 Claims, 13 Drawing Sheets

(56) References Cited

U.S. PATENT DOCUMENTS

| | | |
|---|---|---|
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,623 B2 * | 7/2013 | Jain .................... G06F 17/2705 707/755 |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,646,080 B2 | 2/2014 | Williamson et al. |
| 8,676,857 B1 | 3/2014 | Adams et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 * | 8/2014 | Sun .................... H04L 61/6077 705/7.13 |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,319,288 B2 * | 4/2016 | Somaiya ................ G06F 11/07 |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |

(56) References Cited

U.S. PATENT DOCUMENTS

| | | |
|---|---|---|
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0163039 A1 | 8/2004 | Gorman |
| 2004/0193600 A1 | 9/2004 | Kaasten et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294994 A1* | 11/2008 | Kruger ............... G06Q 10/109 715/733 |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0192957 A1* | 7/2009 | Subramanian ......... G06Q 10/04 706/21 |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1* | 12/2010 | Jolley .................... G06Q 30/02 705/7.29 |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |

(56) References Cited

U.S. PATENT DOCUMENTS

| | | |
|---|---|---|
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097482 A1 | 4/2013 | Marantz et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0157234 A1 | 6/2013 | Gulli et al. |
| 2013/0169666 A1* | 7/2013 | Pacheco ............. G09G 5/02 345/594 |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019461 A1* | 1/2014 | Bredenberg ........... G06Q 30/02 707/754 |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0059498 A1* | 2/2014 | McCormack .......... G06Q 10/06 715/854 |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2015/0019394 A1 | 1/2015 | Unser et al. |
| 2015/0046870 A1 | 2/2015 | Goldenberg et al. |
| 2015/0081370 A1* | 3/2015 | Lo ................. G06Q 10/1095 705/7.19 |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134371 A1* | 5/2015 | Shivakumar .......... G06Q 10/02 705/5 |
| 2015/0213631 A1* | 7/2015 | Vander Broek ....... G06T 11/206 345/589 |
| 2015/0227847 A1* | 8/2015 | Noel ................. G06F 9/542 706/52 |
| 2015/0229532 A1* | 8/2015 | Somaiya ............. H04L 41/22 715/736 |
| 2015/0229546 A1* | 8/2015 | Somaiya ............. H04L 43/045 715/736 |
| 2015/0363478 A1* | 12/2015 | Haynes ............ G06F 17/30575 707/625 |
| 2016/0162497 A1* | 6/2016 | Cho ................. G06F 17/3079 386/241 |

FOREIGN PATENT DOCUMENTS

| | | |
|---|---|---|
| EP | 1672527 | 6/2006 |
| EP | 2551799 | 1/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2911100 | 8/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.
Acklen, Laura, "Absolute Beginners Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

(56) References Cited

OTHER PUBLICATIONS

Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
Rouse, Margaret, "OLAP Cube," http://searchdatamanagement.techtarget.com/definition/OLAP-cube, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Umagandhi et al., "Search Query Recommendations Using Hybrid User Profile with Query Logs," International Journal of Computer Applications, vol. 80, No. 10, Oct. 1, 2013, pp. 7-18.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.

(56) References Cited

OTHER PUBLICATIONS

Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14186225.0 dated Feb. 13, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for European Patent Application No. 15155846.7 dated Jul. 8, 2015.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/247,987 dated Apr. 2, 2015.
Official Communication for U.S. Appl. No. 13/831,791 dated Mar. 4, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,599 dated Jul. 22, 2014.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,147 dated Feb. 19, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated Sep. 9, 2014.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.

\* cited by examiner

RELATIONSHIP VISUALIZATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 61/942,540 entitled "Relationship Visualizations" filed Feb. 20, 2014, which is hereby incorporated by reference in its entirety.

CROSS-REFERENCE TO RELATED APPLICATIONS

This application is related to but does not claim priority from U.S. Pat. No. 8,489,623 entitled "Creating Data In A Data Store Using A Dynamic Ontology" filed May 12, 2011, which is hereby incorporated by reference in its entirety and referred to herein as the "Ontology reference."

This application is related to but does not claim priority from U.S. patent application Ser. No. 13/968,265 entitled "Generating Data Clusters With Customizable Analysis Strategies" filed Aug. 15, 2013, and U.S. patent application Ser. No. 13/968,213 entitled "Prioritizing Data Clusters With Customizable Scoring Strategies" filed Aug. 15, 2013, which are hereby incorporated by reference in their entireties and collectively referred to herein as the "Cluster references."

BACKGROUND

In the area of computer-based platforms, relationship visualizations may be accelerated and/or generated.

SUMMARY

The systems, methods, and devices described herein each have several aspects, no single one of which is solely responsible for its desirable attributes. Without limiting the scope of this disclosure, several non-limiting features will now be discussed briefly.

In some embodiments, a computer system for providing relationship visualizations comprises an object storage device. The object storage device may store information regarding a plurality of objects and properties of respective objects. The computer system may further comprise one or more hardware processors programmed via executable code instructions. When executed, the executable code instructions may cause the computer system to receive, from a user of the computer system, a selection of a plurality of objects. When further executed, the executable code instructions may cause the computer system to determine, based on input from the user or default settings, an action associated with the plurality of objects to include in a visualization. When further executed, the executable code instructions may cause the computer system to identify, in the object storage device, a plurality of the determined actions associated with respective objects. When further executed, the executable code instructions may cause the computer system to determine a first time unit associated with each of a plurality of sections of a first axis. When further executed, the executable code instructions may cause the computer system to determine a second time unit associated with each of a plurality of sections of a second axis. The first time unit may comprise a plurality of the second time units and each section of the first axis may intersect with a plurality of sections of the second axis. When further executed, the executable code instructions may cause the computer system to assign respective first time periods to each of the sections of the first axis based on the determined first time unit and respective second time periods to each of the section of the second axis based on the determined second time unit. For each identified action associated with respective objects, further executed code instructions may cause the computer system to determine, based on one or more properties of the respective object stored in the object storage device, an action time associated with the identified action. For each identified action associated with respective objects, further executed code instructions may cause the computer system to determine a first time period that includes the action time. For each identified action associated with respective objects, further executed code instructions may cause the computer system to determine a second time period that includes the action time. For each identified action associated with respective objects, further executed code instructions may cause the computer system to increment a count of actions associated with the determined first time period and the determined second time period. When further executed, the executable code instructions may cause the computer system to generate user interface data. The generated user interface data may be configured to display the visualization including indicators of the first time periods on respective sections of the first axis. The generated user interface data may be further configured to display the visualization including indicators of the second time periods on respective sections of the second axis. The generated user interface data may be further configured to display the visualization including count indicators at intersections of first time periods and second time periods. The count indicators may correspond to respective counts of actions associated with the respective first time period and second time period.

In some embodiments, a method for providing relationship visualizations may comprise receiving, from a user of a computer system comprising a hardware computer processor, a selection of a plurality of objects. The method may further comprise determining, based on input from the user or default settings, an action associated with the plurality of objects to include in a visualization. The method may further comprise identifying, by the computer system, a plurality of the determined actions associated with respective objects. The method may further comprise determining, by the computer system, a first time unit associated with each of a plurality of sections of a first axis. The method may further comprise determining, by the computer system, a second time unit associated with each of a plurality of sections of a second axis, wherein the first time unit comprises a plurality of the second time units and each section of the first axis intersects with a plurality of sections of the second axis. The method may further comprise assigning, by the computer system, respective first time periods to each of the sections of the first axis based on the determined first time unit and respective second time periods to each of the section of the second axis based on the determined second time unit. The method may further comprise, for each identified action associated with respective objects, determining, by the computer system, based on one or more properties of the respective object, an action time associated with the identified action. The method may further comprise, for each identified action associated with respective objects, determining, by the computer system, a first time period that includes the action time. The method may further comprise, for each identified action associated with respective objects, determining, by the computer system, a second time period that includes the action time. The method may further comprise, for each identified action associated with respective objects, incrementing, by the computer system, a count of actions associated with the determined first time period and the determined second time period. The method may further comprise, generating, by the computer system, user interface data. The generated user interface data may be configured to display the visualization including indicators of the first time periods on respective sections of the first axis. The generated user interface data may be further configured to display the visualization including indicators of the second time periods on respective sections of the second axis. The generated user interface data may be further configured to display the visualization including count indicators at intersections of first time periods and second time periods. The count indicators may correspond to respective counts of actions associated with the respective first time period and second time period.

In some embodiments, a non-transitory computer storage comprises instructions for causing a computer system to provide relationship visualizations. When executed, the code instructions may cause the computer system to receive, from a user of the computer system, a selection of a plurality of objects. When further executed, the code instructions may cause the computer system to determine, based on input from the user or default settings, an action associated with the plurality of objects to include in a visualization. When further executed, the code instructions may cause the computer system to identify a plurality of the determined actions associated with respective objects. When further executed, the code instructions may cause the computer system to determine a first time unit associated with each of a plurality of sections of a first axis. When further executed, the code instructions may cause the computer system to determine a second time unit associated with each of a plurality of sections of a second axis. The first time unit may comprise a plurality of the second time units and each section of the first axis may intersect with a plurality of sections of the second axis. When further executed, the code instructions may cause the computer system to assign respective first time periods to each of the sections of the first axis based on the determined first time unit and respective second time periods to each of the section of the second axis based on the determined second time unit. For each identified action associated with respective objects, further executed code instructions may cause the computer system to determine, based on one or more properties of the respective object, an action time associated with the identified action. For each identified action associated with respective objects, further executed code instructions may cause the computer system to determine a first time period that includes the action time. For each identified action associated with respective objects, further executed code instructions may cause the computer system to determine a second time period that includes the action time. For each identified action associated with respective objects, further executed code instructions may cause the computer system to increment a count of actions associated with the determined first time period and the determined second time period. When further executed, the code instructions may cause the computer system to generate user interface data. The generated user interface data may be configured to display the visualization including indicators of the first time periods on respective sections of the first axis. The generated user interface data may be further configured to display the visualization including indicators of the second time periods on respective sections of the second axis. The generated user interface data may be further configured to display the visualization including count indicators at intersections of first time periods and second time periods. The count indicators may correspond to respective counts of actions associated with the respective first time period and second time period.

BRIEF DESCRIPTION OF THE DRAWINGS

Certain aspects of the disclosure will become more readily appreciated as those aspects become better understood by reference to the following detailed description, when taken in conjunction with the accompanying drawings.

DETAILED DESCRIPTION

Relationship visualizations may be accelerated and/or generated. For example, a heat map is one type of relationship visualization that may be generated to display relationships through color, saturation, gradient, and/or hue.

Disclosed herein are systems, methods, techniques, and devices for accelerating relationship visualizations related to one or more data objects and/or properties of those data objects. Using the techniques and systems described herein, efficient, flexible, scalable, navigable, and accelerated relationship visualizations may be achieved. In one particular example implementation of the systems and methods discussed herein, data objects and/or the relationships of data objects may be displayed through a matrix visualization where some relationships are displayed through gradient, color, hue, and/or saturation. In some embodiments, the relationship matrix may comprise a time matrix. A subset of the data objects and/or a time period for display may be determined automatically by the relationship matrix system. Furthermore, the relationship matrix system may receive user interaction data to allow navigable, efficient, and/or accelerated relationship matrices.

Example Relationship Matrix Acceleration

Figure 1:
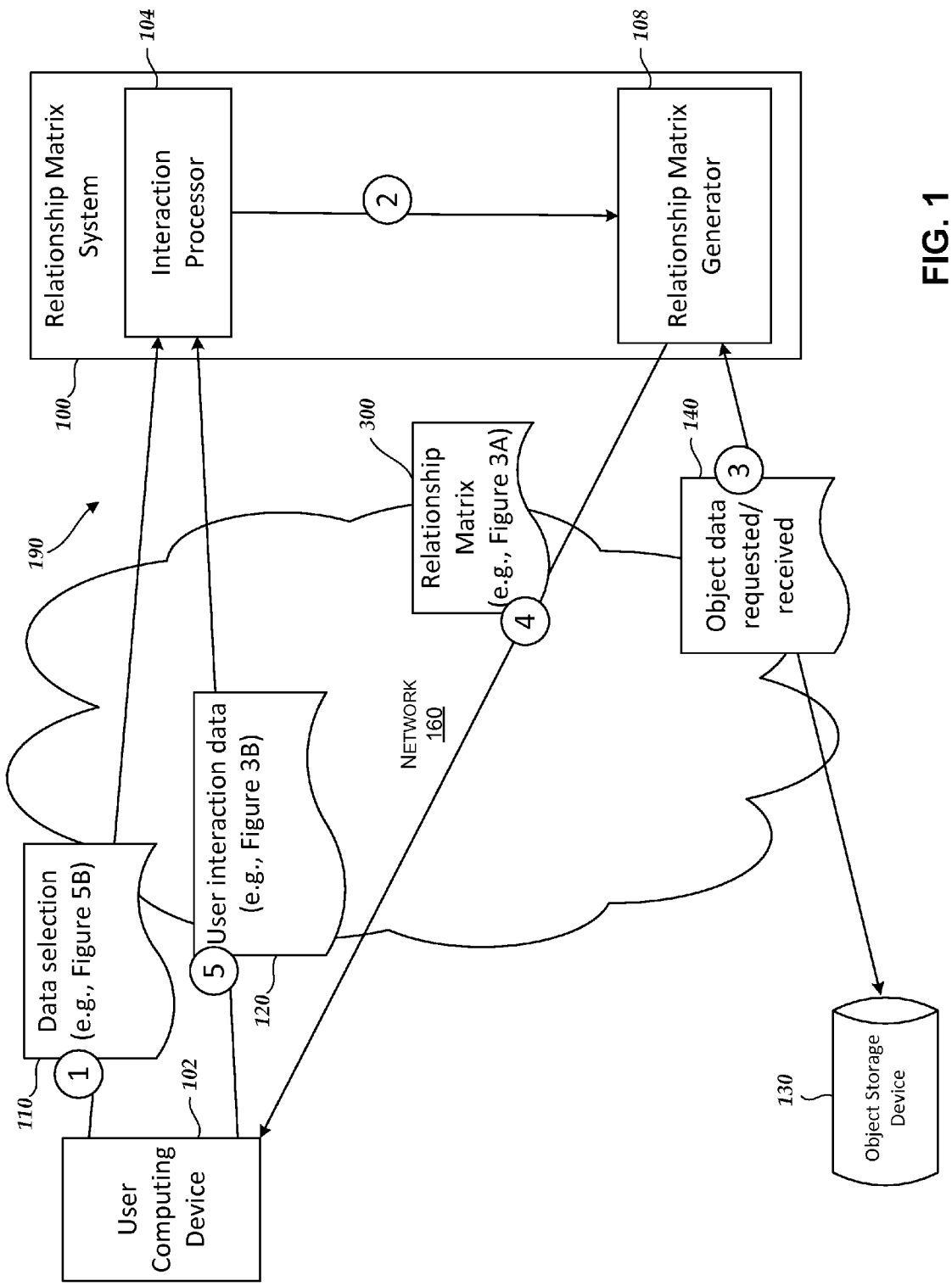
FIG. 1 is a block diagram illustrating an example relationship matrix system, according to some embodiments of the present disclosure.

FIG. 1 illustrates a relationship matrix system, according to some embodiments of the present disclosure. In the example embodiment of FIG. 1, the matrix environment 190 comprises a network 160, a relationship matrix system 100, a user computing device 102, and an object storage device 130. Various communications between these devices are illustrated. For example, communication of a data selection 110, user interaction 120, object data 140, and a relationship matrix 300 are illustrated in various actions 1-5 that are illustrated in the circled numbers in FIG. 1. In this embodiment, the relationship matrix system 100 includes an interaction processor 104 and a relationship matrix generator 108, each of which is described in further detail below.

In some embodiments, the matrix environment 190 may not comprise a network. For example, the user computing device 102, the relationship matrix system 100, and/or the object storage device 130 may reside on the same computing device.

Figure 5A:
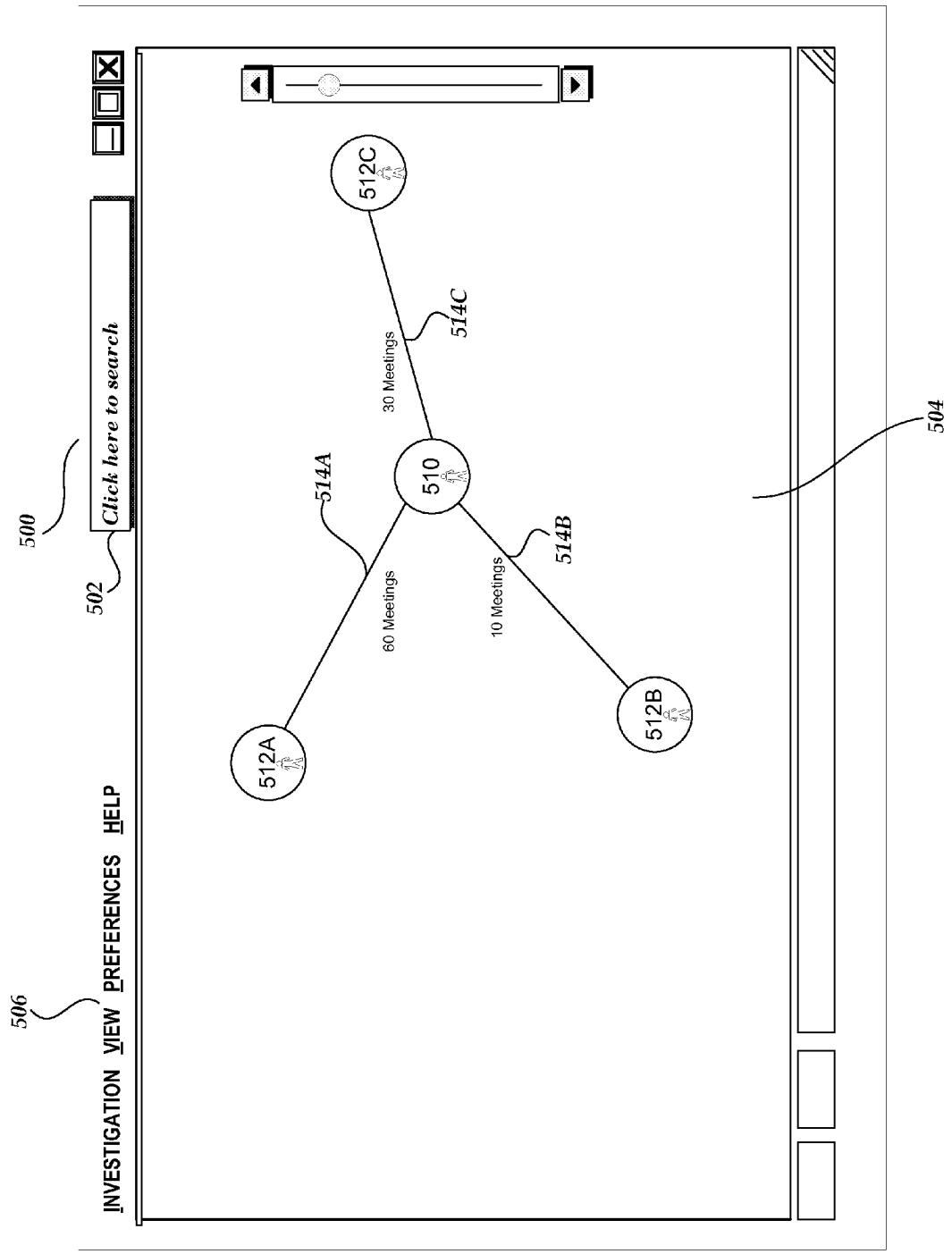
FIG. 5A, illustrates an example user interface of the relationship matrix system for loading and/or viewing data objects, according to some embodiments of the present disclosure.

As shown in FIG. 1, at action one, a data selection 110 is transmitted from the user computing device 102 to the interaction processor 104 of the relationship matrix system 100. The data selection may occur through a user interface. FIG. 5A, for example, illustrates an example user interface 500 of a software application configured to display data objects and to allow the user to select one or more of the data objects. The example user interface 500 comprises a search box 502, an object display area 504, and a menu bar 506. A human operator, e.g., the user of the user computing device 102 of FIG. 1, by typing and/or entering data into the search box 502 may load, lookup, and/or retrieve one or more data objects. For example, by typing the name of a person, such as "John Doe," the person object 510 may be displayed in the object display area 504. The other person objects 512 (including objects 512A, 512B, and/or 512C) may be displayed automatically and/or after user interaction by the human operator with the person object 510. For example, a human operator may select the person object 510 and select an option to display associates and/or persons related to the person object 510. The links 514A, 514B, and/or 514C may display relationships between the person object 510 and related person objects 512A, 512B, and/or 512C, respectively. For example, the person objects 412 may be related to the person object 410, such as, but not limited to, associates, acquaintances, and/or family members. The links 514A, 514B, and/or 514C may comprise one or more meetings between the person object 510 and related person objects 512A, 512B, and/or 512C, respectively. For example, link 514B may display that there were 10 meetings between person object 510 and related person object 512B. The links 514A, 514B, and/or 514C may represent meeting data objects. The user interface 500 may be capable of displaying any type of data object and/or may not be limited to displaying person and meeting data objects.

In some embodiments, the data objects in the object display area 504 may be selectable through mouse clicks, touch input, and/or any other input mechanism.

In some embodiments, the user interface 500 may display objects and/or other data in clusters, which may correspond to the systems, methods, and/or techniques disclosed in the Ontology and/or Cluster references.

In addition to visually searching and/or showing data objects and/or relationships between data objects, the user interface 500 may allow various other manipulations. For example, data objects may be inspected (e.g., by viewing properties and/or associated data of the data objects), filtered (e.g., narrowing the universe of objects into sets and subsets by properties or relationships), and statistically aggregated (e.g., numerically summarized based on summarization criteria), among other operations and visualizations.

Figure 5B:
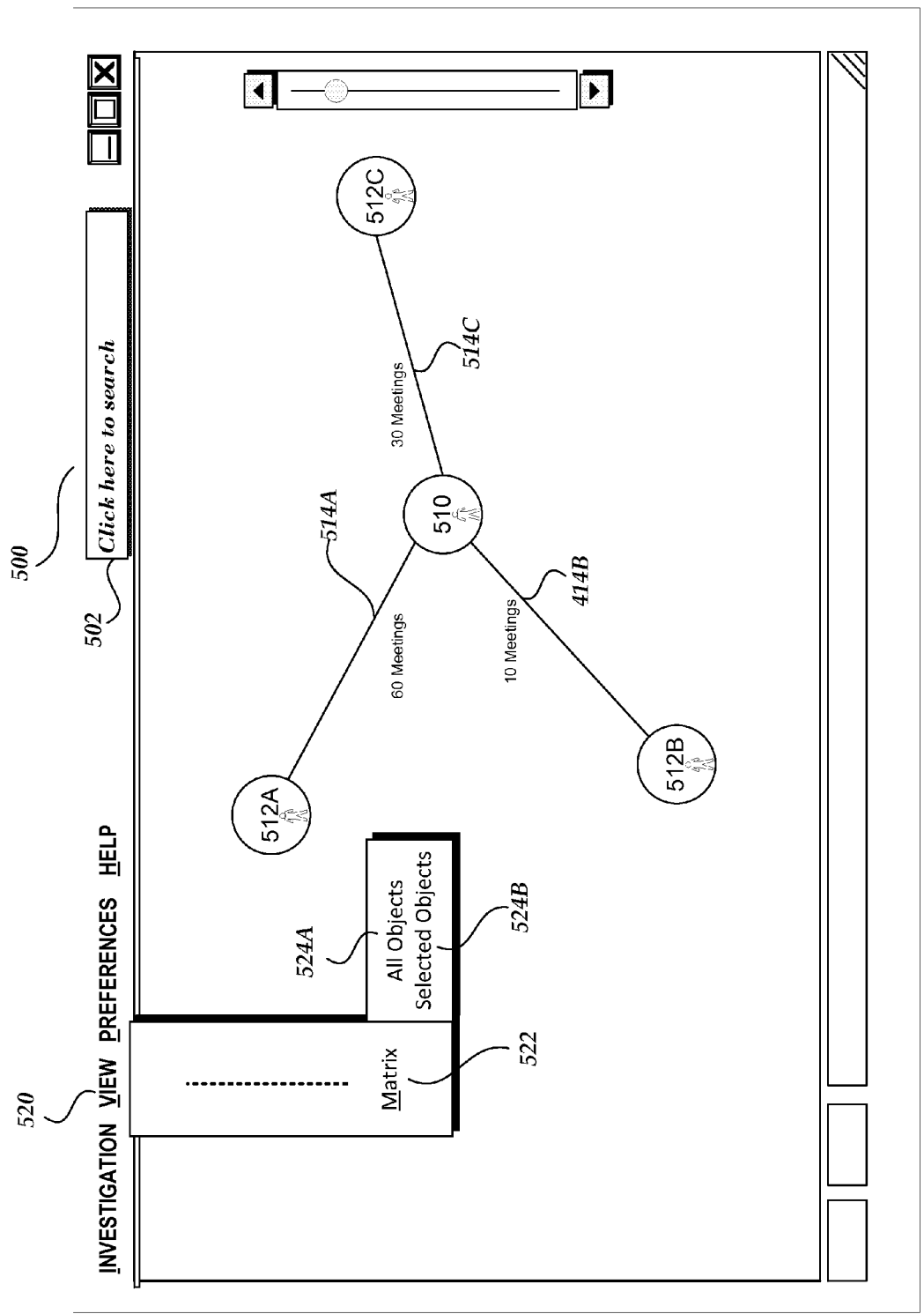
FIG. 5B illustrates an example user interface of the relationship matrix system for selecting data objects to generate a matrix, according to some embodiments of the present disclosure.

When a human operator has loaded the data objects, the user may then generate a relationship matrix from some or all of those data objects and/or from related data objects. For example, FIG. 5B illustrates the user interface 500 of FIG. 5A comprising a matrix menu option to generate a matrix based on the loaded data objects (such as the one or more of the data objects displayed in this embodiment). In this example, the human operator has the option of selecting the "All Objects" menu item 524A or the "Selected Objects" menu item 524B by accessing the "View" menu 520, selecting the "Matrix" menu item 522, and then choosing a matrix menu item 524. For example, a matrix may be generated from all of the data objects presented by the user interface when the "All Objects" menu item 524A is selected. In some embodiments, the user interface 500 may allow the human operator to select individual and/or one or more groups of data objects, whether or not those objects remain viewable in the display area 404. Thus, upon selecting the "Selected Objects" menu item 524B a matrix may be generated from the selected data objects and/or related data objects. The example user interface 500 allows the human operator to send a data selection 110 to the interaction processor 104 and/or the relationship matrix system 100 of FIG. 1 through selecting and/or loading of data objects and/or selection of menu items 524.

Returning to FIG. 1, the interaction processor 104 may receive the data selection 110 from the user computing device 102 through the network 160. The interaction processor 104 may then process the data selection 110. For example, the interaction processor 104 may identify and/or interpret the data objects selected from FIG. 5B. At action two, the interaction processor 104 may then send data, including the interpreted, modified, and/or unmodified data selection 110, to the relationship matrix generator 108. At action three, the relationship matrix generator 108 may request, receive, and/or load information and/or data regarding the data objects, such as, but not limited to, object data 140, identified in the data selection 110 and/or related to the data selection 110 from the object storage device 130.

In some embodiments, the relationship matrix system may determine one or more additional data objects based on the one or more selected objects. For example, meeting objects and/or event objects for a selected person object may be determined programmatically, such as by using techniques discussed in the Cluster references. For example, the selected person data object, which may correspond to the data selection 1110 of FIG. 1, may be a starting point to determine one or more additional related data objects. The additional related data objects may then be processed by the relationship matrix system.

Figure 2:
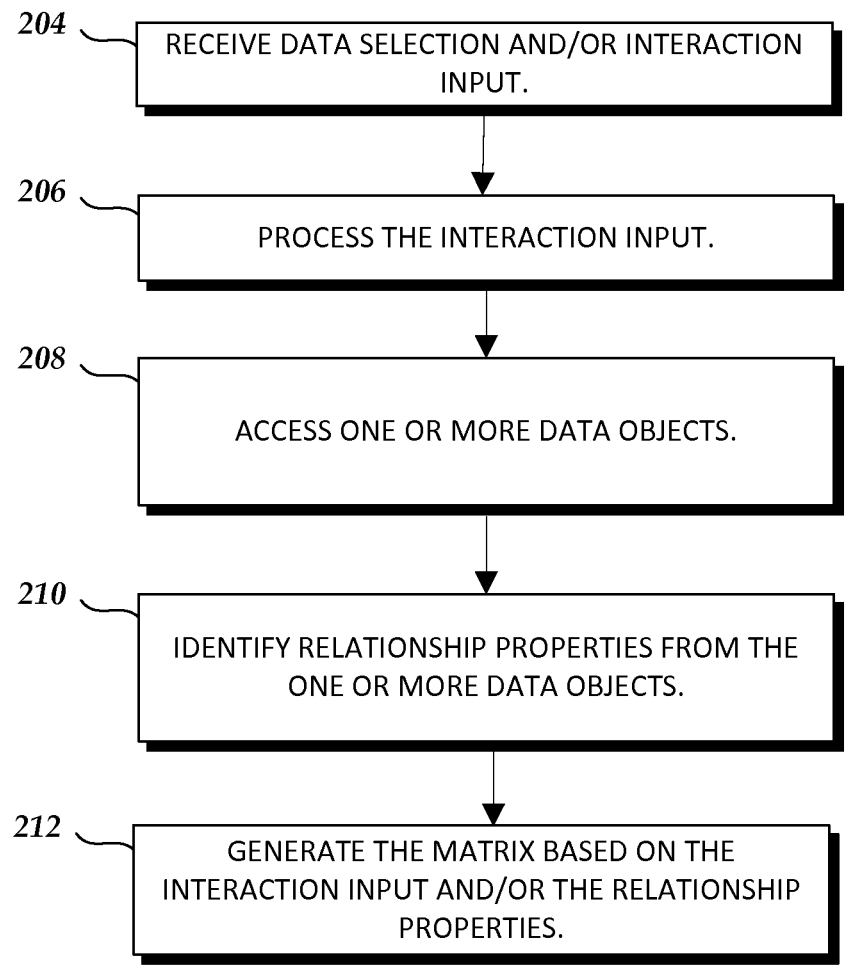
FIG. 2 is a flowchart illustrating a relationship matrix generation process, according to some embodiments of the present disclosure.
Figure 3A:
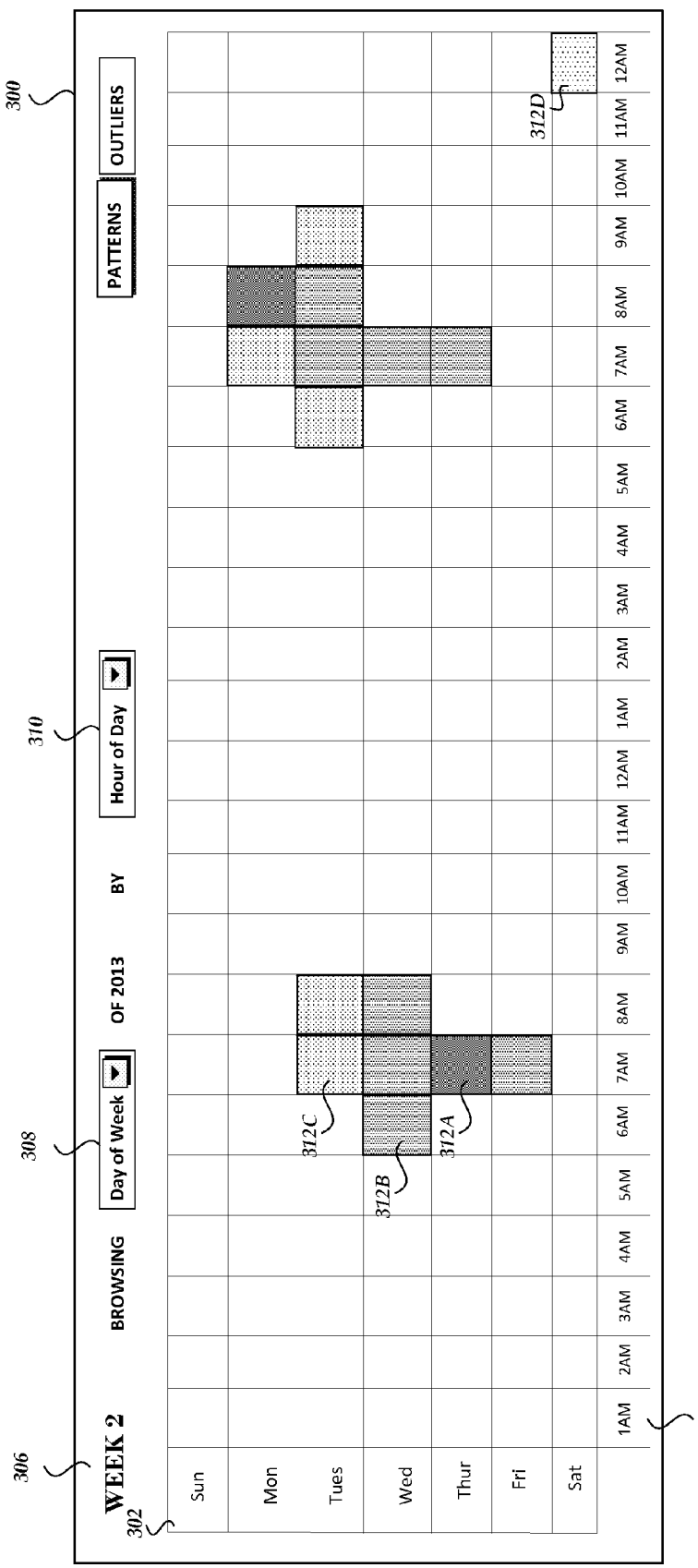
FIG. 3A illustrates an example relationship matrix, according to some embodiments of the present disclosure.

The relationship matrix generator 108 may generate the relationship matrix 300 from the requested and/or received object data 140, which is discussed further with reference to FIG. 2. At action four, the relationship matrix 300 may be sent to the user computing device 102 through the network 160. For example, FIG. 3A illustrates an example relationship matrix 300. The relationship matrix 300 of FIG. 3A may have been generated from the selected data objects of FIG. 5B and/or related data objects. The relationship matrix 300 may comprise a time matrix. The relationship blocks 312 (including blocks 312A, 312B, 312C, and/or 312D) may represent relationships between the Y and/or vertical axis 302 and the X and/or horizontal axis 304. For example, the block 312A may represent a relationship between "7 AM" on the X axis and "Thur" on the Y axis. In the example, the intersection at blocks 312 between the X and Y axes may correspond to the meeting objects that were shown in FIG. 5B. The gradient, color, hue, and/or saturation at blocks 312 may further represent and/or indicate relationships between the X and/or Y axes and/or display summary information regarding the objects being represented. For example, block 312A may be a darker and/or more concentrated color, hue, and/or saturation than block 312B. In the example, a darker and/or more concentrated color, hue, and/or saturation may represent a greater number of objects and/or instances at a particular intersection. Therefore, there may be more meetings and/or events at Thursday at 7 AM than Wednesday at 6 AM as indicated by block 312A in comparison to block 312B because block 312A may be a darker and/or more concentrated color, hue, and/or saturation than block 312B.

The relationship matrix 300 may display other relationship information and/or data and/or accelerate visualizations of relationships. The relationship matrix 300 may display a portion and/or subselection of the selected data objects from FIG. 5B. For example, the macro unit indicator 306 may indicate a time unit that is currently being displayed. In the example, the macro unit indicator 306 may display "WEEK 2," which may indicate to the human operator that only objects from the second week of the year are being shown. The portion and/or subselection of the selected data objects from FIG. 5B may be determined by default settings and/or the relationship matrix generator 108 of FIG. 1. For example, the relationship matrix generator 108 may analyze the selected meeting objects from FIG. 5B to determine a time period to show the highest concentration of meeting objects. The meeting objects may comprise an action time and/or event time property. The action time and/or event time property may correspond to the time at which a meeting occurred. For example, if ninety out of the one hundred meetings occurred during the second week of year, then the relationship matrix generator 108 of FIG. 1 may determine that the second week of the year should be displayed initially as shown in FIG. 3A. In the example relationship matrix of FIG. 3A, the relationship matrix generator 108 of FIG. 1 may have determined that the second week of the year had the highest concentration of objects, and, therefore, displayed the second week of the year. In some embodiments, the initial time period shown may be determined by default settings.

Figure 3B:
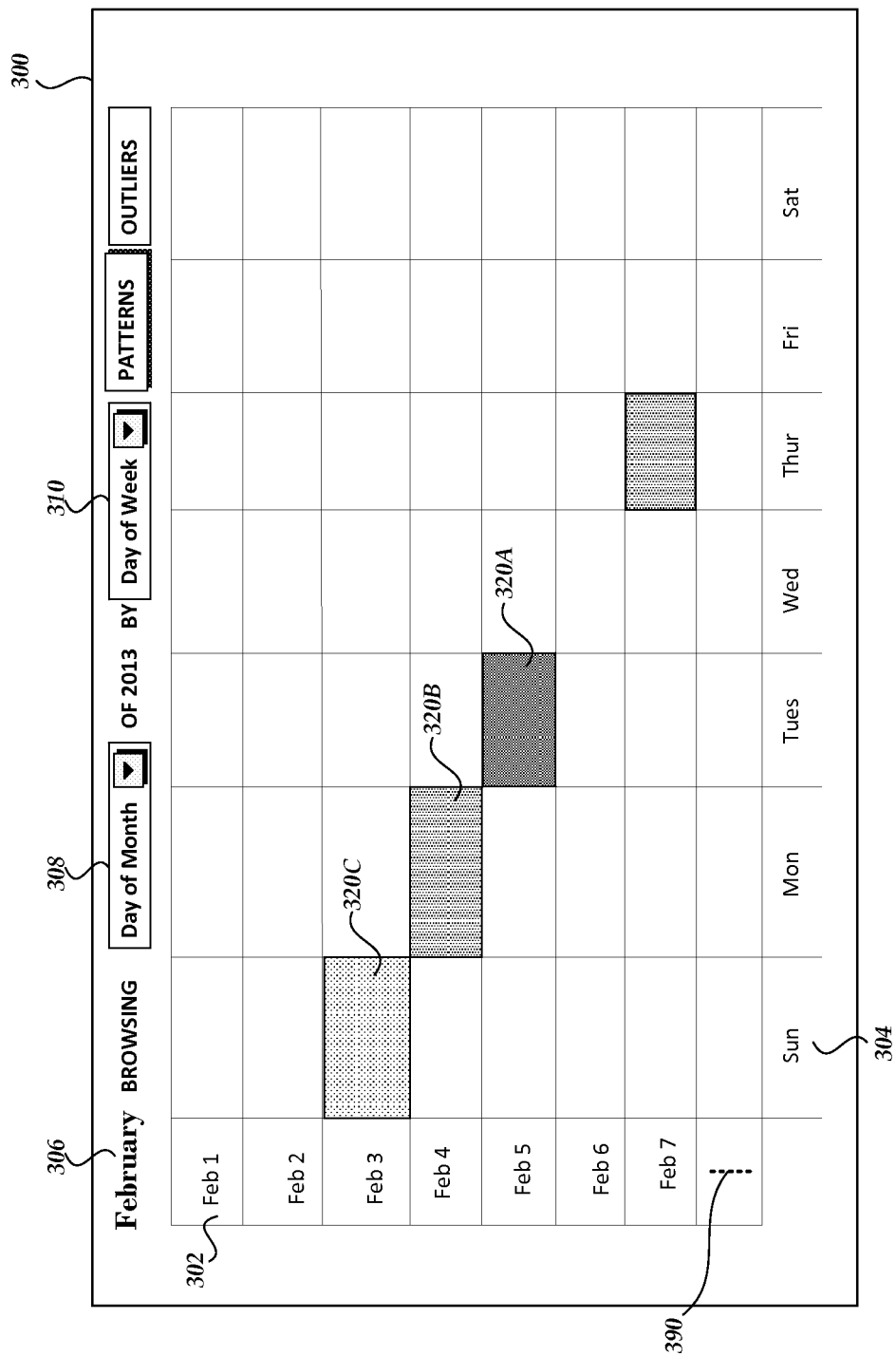
FIG. 3B illustrates an example relationship matrix configured to update the units for the axes, according to some embodiments of the present disclosure.

The relationship matrix may automatically and/or based on default settings determine configurations and/or accelerate visualizations of relationships. The relationship matrix may indicate that the human operator is "BROWSING 'Day of Week' OF 2013 BY 'Hour of day.'" The "Day of Week" text may comprise a Y axis selector 308, which may allow the human operator to select different units for the Y axis. Similarly, the "Hour of Day" text may comprise an X axis selector 310, which may allow human operator to select different units for the X axis. For example, the available time units for the axes may comprise the options, such as, but not limited to: "Hour of Day," "Day of Week," "Day of Month," "Week of Month," "Month of Year." Similar to the displayed time period, the time units of the axes that are initially displayed may be based on default settings and/or may be determined by the relationship matrix generator 108 of FIG. 1. The relationship matrix generator 108 may analyze the selected and/or determined meeting objects from FIG. 5B to determine an X time unit and/or a Y time unit to show the highest concentration of meeting objects in a time period. For example, the relationship matrix generator 108 of FIG. 1 may have determined that "Day of Week" for the Y axis should be displayed to accelerate visualizations of relationships by the human operator. In some embodiments, the relationship matrix generator 108 of FIG. 1 may display a subset and/or portion of the X and/or Y axes. For example, FIG. 3B illustrates an example relationship matrix 300 with different time units. In the example, the Y axis selector 308 may be set to "Day of Month" and/or the X axis selector 310 may be set to "Day of Week." In some embodiments, the vertical ellipsis 390 along the Y axis may indicate that only the time units of February 1 through February 7 are shown. The relationship matrix generator 108 of FIG. 1 may have determined that the highest concentration of objects occurred in that time period and, therefore, selected the time period of February 1 through February 7 to display. In some embodiments, the relationship matrix system 100 and/or the relationship matrix generator 108 may be configured to display the lowest concentration of objects. In some embodiments, the vertical ellipsis 390 of FIG. 3B may indicate that all of the days of the month February are displayed to the human operator. In some embodiments, the relationship matrix system 100 and/or the relationship matrix generator 108 of FIG. 1 may automatically determine other features and/or characteristics of the relationship matrix 300 of FIG. 3 based on the selected, determined, and/or related data objects, such as the objects from FIG. 5B.

Returning to FIG. 1, at action five, the human operator may interact with the relationship matrix 300, which may cause the user computing device 102 to send user interaction data 120 to the interaction processor 104 and/or the relationship matrix system 100 through the network 160. For example, the human operator may interact with the relationship matrix 300 of FIG. 3A. The human operator may select and/or change the Y axis selector 308 and/or X axis selector 310 through a mouse click, touch input, and/or some other input mechanism. For example, as shown in FIG. 3B, a human operator may have changed the Y axis selector 308 to "Day of Month" and/or may have changed the X axis selector 310 to "Day of week." The change by the human operator may cause the user computing device 102 to send the user interaction data 120 of FIG. 1, which may correspond to the Y axis selector 308 change and/or X axis selector 310 change. As a result, actions two, three, four, or a subset thereof, may be performed and/or repeated to generated a relationship matrix 300 as shown in FIG. 3B. For example, the relationship matrix generator 108 may receive the user interaction data 120 and/or data based on the user interaction data 120 from the interaction processor 104. The relationship matrix generator 108 may optionally request, receive, and/or load data objects from the object storage device 130. The relationship matrix generator 108 may then generate the relationship matrix 300, as shown in FIG. 3B, based on the user interaction of modifying the Y axis selector 308 and/or X axis selector 310.

Example Relationship Matrix Generation Process

FIG. 2 is a flowchart illustrating a relationship matrix generation process, according to some embodiments of the present disclosure. The method of FIG. 2 may be performed by the relationship matrix system 100 of FIG. 1, such as the various components of FIG. 1 that are discussed above, including the relationship matrix generator 108 and/or interaction processor 104. Depending on the embodiment, the method of FIG. 2 may include fewer or additional blocks and/or the blocks may be performed in order different than is illustrated.

Beginning at block 204, data selection and/or interaction input data is received. Data selection may comprise one or more data objects selected and/or determined from the user interface. For example, user interaction input data may be received after human operator interaction illustrated in FIG. 3B and/or other interactions disclosed herein. In the example, the user interaction input data may comprise a change to the Y axis selector 308 and/or X axis selector 310.

At block 206, the interaction input data is processed. In some embodiments, the interaction input data may be transformed. The user interaction data 120 received from the user computing device of FIG. 1 may comprise a format such as, but not limited to, XML, JSON, HTML response/request format, a file format that is proprietary to the relationship matrix system, or any other format. For example, the user interaction data 120 may comprise an XML data format initially and be processed and/or transformed into another data format, such as, but not limited to, an object data format. The user interaction data may be transformed and/or incorporated into an object representing the relationship matrix user interface. Therefore, the properties of the relationship matrix, such as the user interactions, may be accessed by the relationship matrix system 100 and/or relationship matrix generator 108 of FIG. 1.

At block 208, one or more data objects and/or properties of one or more data objects are accessed. For example, a meeting object, including some or all of the properties of that meeting object, may be accessed by the relationship system 100. The meeting object may comprise one or more, time objects, time properties, a location, a link to other person data objects, and other data. In some embodiments, as previously discussed, a data object may be a starting point to load additional related data objects, such as, but not limited to, loading all the meeting and/or event objects corresponding to a person object.

At block 210, relationship properties from the one or more data objects are identified. For example, time objects and/or time properties may comprise relationship properties that are identified. In some embodiments, relationship properties of person data objects are accessed. For example, a person data object may comprise a meetings property that comprises all of the meetings the person data object had with other person data objects. In some embodiments, actions and/or action objects may be identified for respective objects. For example, meeting objects may be determined for person objects. A time and/or action time property may be associated with the meeting objects. Thus, in one example, a user selects one or more object properties of interest (e.g., all "meeting" events associated with a particular person object), and those event objects matching the properties are located ("matched") for inclusion in the relationship matrix.

At block 212, the relationship matrix is generated based on the interaction input data and/or the relationship properties accessed from the data objects. For example, the matrix 300 of FIG. 3B may be generated from user interaction data and/or relationship properties of data objects. The user interaction input data comprising the "Day of Month" selection from the Y axis input selector may be used to generate the relationship matrix 300 of FIG. 3B. For example, since "Day of Month" was selected, the Y axis may comprise time units of days of the months, such as, February 1, 2, 3, etc., as illustrated by FIG. 3B. Similarly, the user interaction input comprising the "Day of Week"" selection from the X axis input selector may be used to generate the labels on the X axis comprising "Sunday," "Monday," etc., as illustrated by FIG. 3B. The relationship blocks 320 (including blocks 320A, 320B, and/or 320C) may be generated based on data objects and/or relationship properties of data objects. For example, meeting data objects may be filtered by a month, such as, the month February as shown in FIG. 3B. Additionally, meeting data objects may be categorized by a day of the week property (e.g., Monday, Tuesday, Wednesday) and/or day of the month property (e.g., February 1, 2, etc.). The relationship blocks 320A, 320B, and/or 320C may correspond to groups of meeting data objects with time properties corresponding to the intersection of the X and Y axes. For example, the relationship block at 320A may comprise time properties corresponding to Feb. 5, 2013, which was a Tuesday. Additionally, as previously discussed, the relative gradient, color, hue, and/or saturation may correspond to the number of objects with the particular time properties at a given intersection. In the example, there may be more meeting data objects corresponding to relationship block 320A than relationship block 320B, which may correspond to the relative gradient, color, hue, and/or saturation between the two blocks.

In some embodiments, time properties may be accessed and/or used to generate the relationship matrix. For example, as discussed above, a first time period and/or second time period may be automatically determined corresponding to the time units associated with the X and/or Y axes of the generated relationship matrix. As illustrated above, time units and/or periods, such as "Day of Month," "Month of Year," the month "January," and/or second week of the year, may be automatically determined to show the highest concentration of objects in the relationship matrix.

Data Objects

In some embodiments, data is conceptually structured according to an object data model represented by an ontology. The conceptual data model may be independent of any particular and/or specific type of data store. For example, each object of the conceptual data model may correspond to one or more rows in a relational database, an object in an in-memory cache, and/or some combination thereof.

In some embodiments, an ontology, as noted above, may include stored information providing a data model for storage of data in a data store. The ontology may be defined by one or more object types, which may each be associated with one or more property types. At the highest level of abstraction, a data object is a container for information representing things and/or events in the physical world. For example, a data object may represent an entity such as a person, a place, an organization, a market instrument, and/or some other noun. Data objects may represent an event that happens at a point in time and/or for a duration. Data objects may represent a document and/or other unstructured data source such as an e-mail message, a news report, a written paper, and/or a written article. Each data object may be associated with a unique identifier that uniquely identifies the data object within the data store.

Different types of data objects may have different property types. For example, a "Person" data object may have an "Eye Color" property type and an "Event" data object may have a "Date" property type. Each property as represented by data in the data store may have a property type defined by the ontology used by the data store.

Objects may be instantiated in the data store in accordance with the corresponding object definition for the particular object in the ontology. For example, a specific monetary payment (e.g., an object of type "event") of US$30.00 (e.g., a property of type "currency") taking place on Mar. 27, 2009 (e.g., a property of type "date") may be stored in the data store as an event object with associated currency and date properties as defined within the ontology.

The data objects defined in the ontology may support property multiplicity. For example, a data object may be allowed to have more than one property of the same property type. For example, a "Person" data object may have multiple "Address" properties. In another example, a "Meeting" data object may have multiple "Name" properties.

In some embodiments, the data objects the template system receives may correspond to an ontology according to the systems, methods, and/or techniques disclosed in the Ontology reference.

Example Relationship Matrix User Interactions

FIG. 3 (including FIGS. 3A-3G) illustrates example user interactions of relationship matrices. Relationship matrices may support other user interactions and the following actions are illustrative and/or non-limiting of the user interactions contemplated by the present disclosure for accelerating relationship visualizations.

In some embodiments, as previously illustrated, a human operator may change the Y axis selector 308 and/or X axis selector 310 of FIG. 3A to automatically update and/or generate the relationship matrix 300 of FIG. 3B. For example, a change to the Y axis selector 308 of FIG. 3A from "Day of Week" to "Day of Month" may cause an automatic update to the labels of the Y axis 302 from "Sun, Mon, etc." to "February 1, February 2, etc." as shown in FIG. 3B. Similarly, a change to the X axis selector 310 may cause an automatic update to the labels of the X axis 304 of FIG. 3A to the labels of FIG. 3B. Changes to the one or more of the axis selectors may cause other changes. For example, the macro unit indicator 306 of FIG. 3A may change from "Week 2" to "February" as illustrated by FIG. 3B. Similarly, different relationship blocks at the intersections between the Y axis 302 and X axis 304 may automatically appear and/or update following a change to one or more of the axis selectors (e.g., compare the relationship blocks 312 of FIG. 3A with the relationship blocks 320 of FIG. 3B).

Figure 3C:
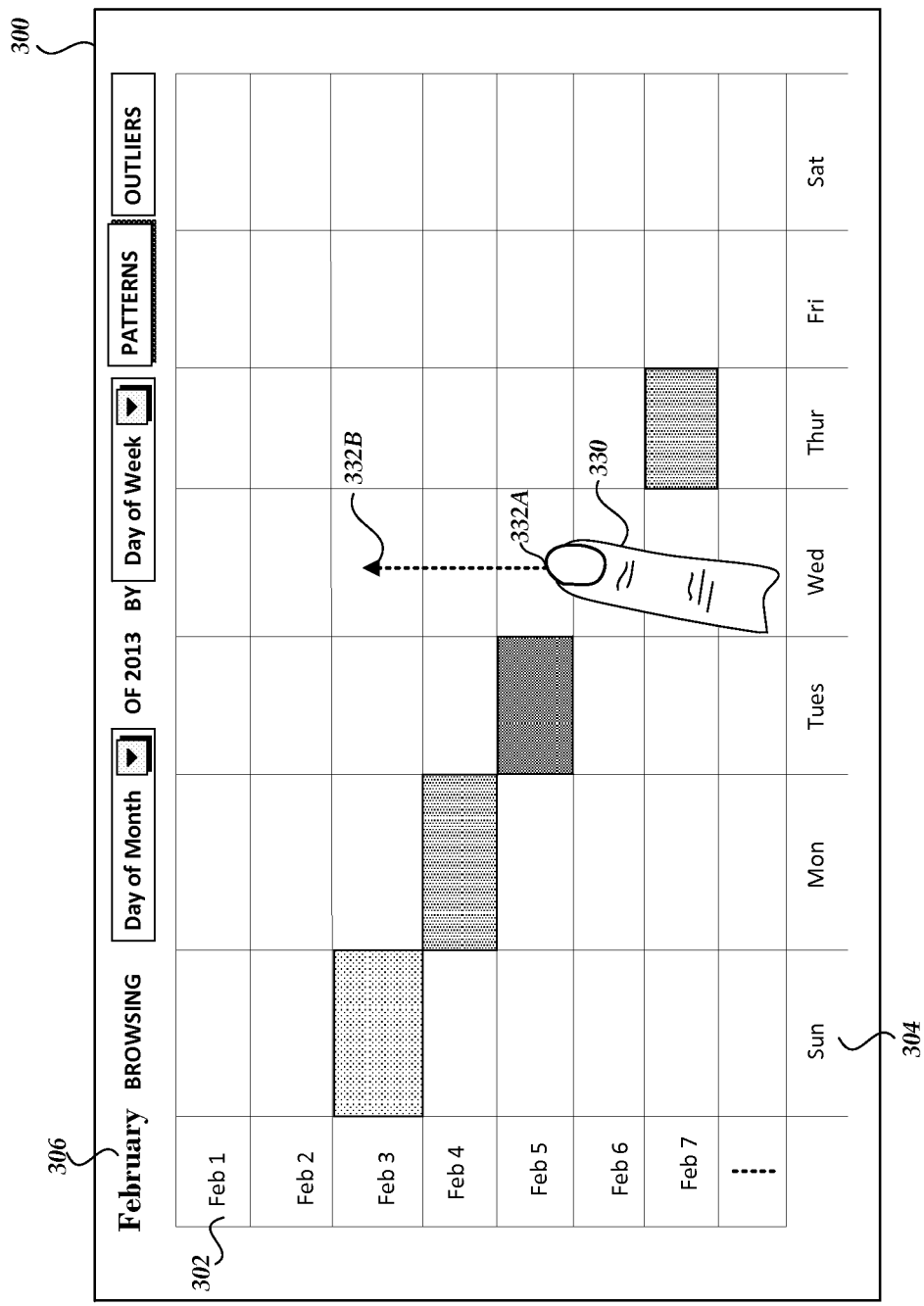
FIG. 3C illustrates an example relationship matrix configured to update time periods, according to some embodiments of the present disclosure.

FIG. 3C illustrates an example relationship matrix configured to update time periods and/or unit periods based on user interaction. For example, the relationship matrix 300 may be configured to display relationship blocks for the time period of February, as illustrated by macro unit indicator 306. A human operator may interact through user interaction input, such as, but not limited to, touch input, mouse input, and/or any other kind of interaction input, with the relationship matrix 300 to update time periods and/or unit periods. For example, the human operator may place a finger 330, hold a mouse click, or any other input mechanism, at a starting point 332A on the relationship grid. The human operator may then drag their finger 330 or move the mouse to ending point 332B. As a result of the user interaction, the relationship matrix may update the time period and/or unit period. In the example, relationship matrix 300 may update to the month of March, which may include updating the macro unit indicator 306, the labels of the Y axis 302, and/or the relationship blocks of the grid.

In some embodiments, there may be variations for updating the time periods and/or unit periods of the relationship matrix. For example, a swiping motion and/or mouse click from point 332B to 332A may cause the relationship matrix 300 to update to the month of January (a decrement and/or change of the time period). In some embodiments, the swiping motions to increment and/or decrement the unit periods may be reversed and/or configurable by the human operator. For example, instead of the vertical swiping motion illustrated in FIG. 3C, the swiping motion may be horizontal, configurable between the two motions, and/or some combination thereof. In some embodiments, there may be a minimum and/or maximum threshold for the relative distance between points 332A and 332B to register and/or cause an update to the unit periods.

In some embodiments, changing time periods and or unit periods may depend on the time and/or unit periods being displayed. For example, the swiping motion illustrated in FIG. 3B may cause the week to change in FIG. 3A. "Week 2" is displayed in FIG. 3A and a swiping motion and/or mouse drag may cause the week displayed to increment or decrement to "Week 3" or "Week 1," respectively.

Figure 3D:
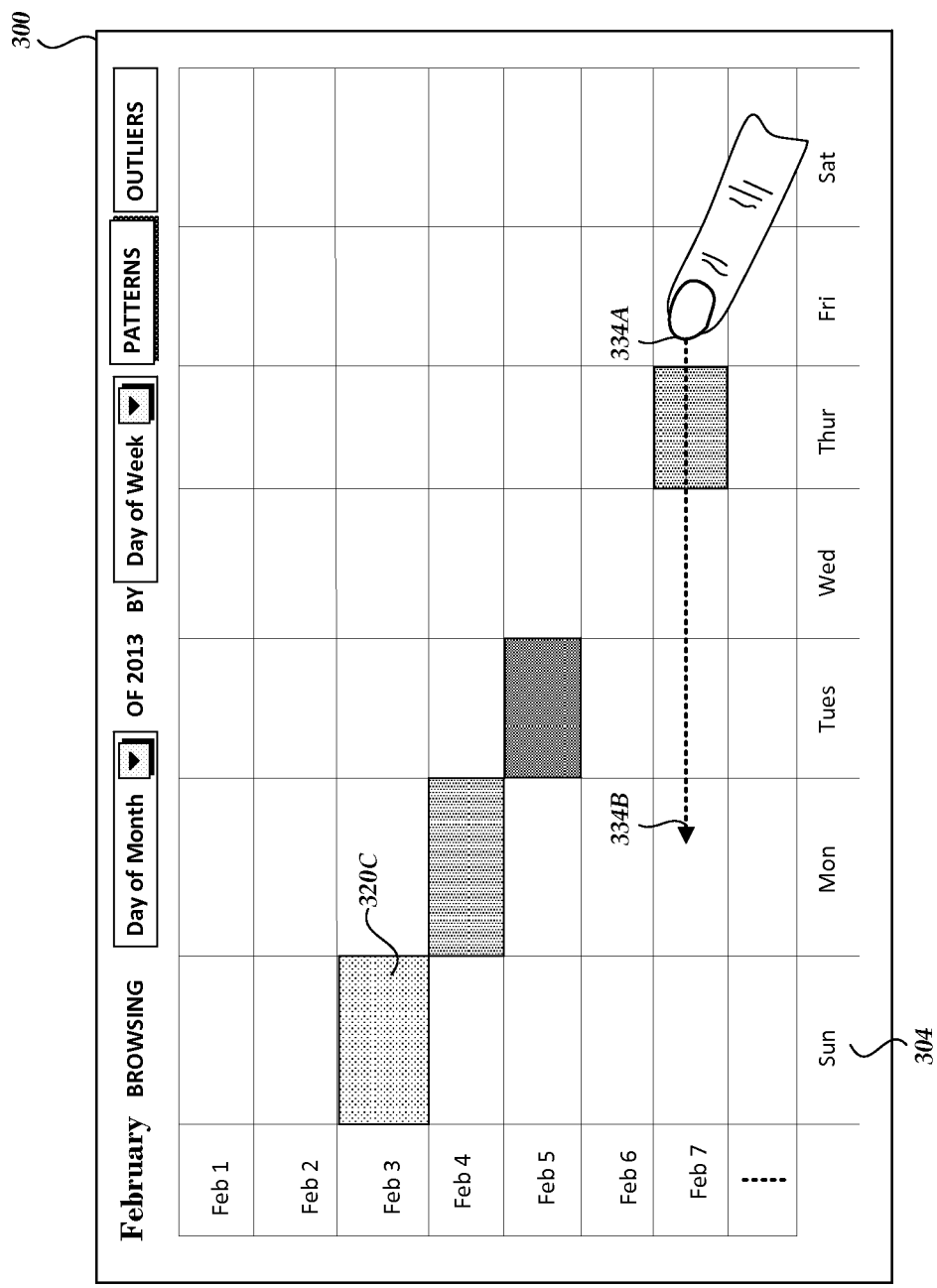
FIG. 3D illustrates an example relationship matrix configured to update its alignment, according to some embodiments of the present disclosure.

FIG. 3D illustrates an example relationship matrix configured to update the alignment of its grid based on user interaction. Similar to the touch, mouse, and/or other input mechanisms illustrated in FIG. 3C, a human operator may interact with the relationship matrix 300 to update the alignment of the grid of the relationship matrix 300 of FIG. 3D. For example, similar to the interaction of FIG. 3C, the human operator may drag a finger and/or hold a mouse click from starting point 334A to ending point 334B on the relationship grid of FIG. 3D. Receipt of the horizontal input data by the relationship matrix system may cause the relationship matrix 300 to update as illustrated by the grid alignment of FIG. 3E.

Figure 3E:
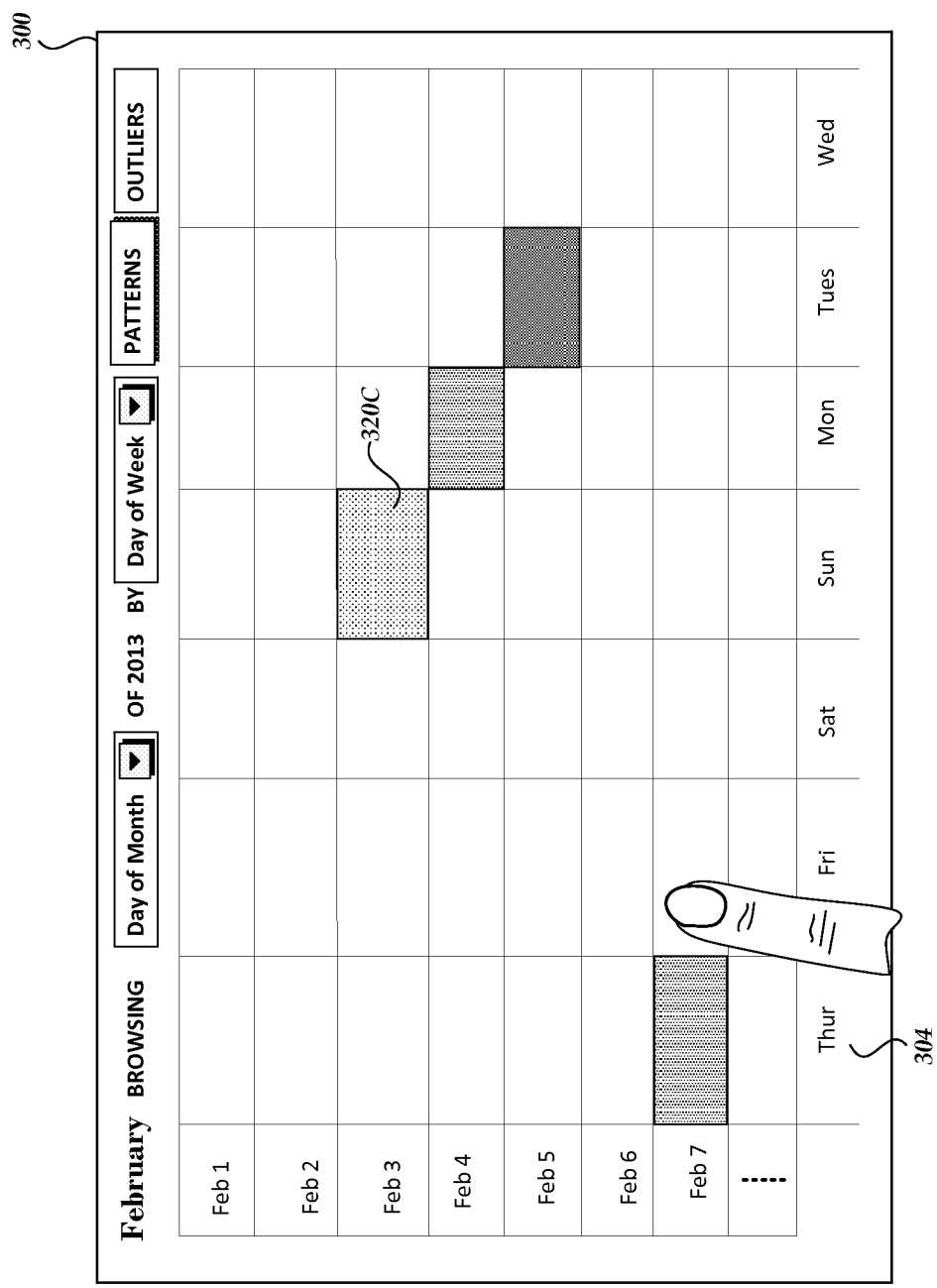
FIG. 3E illustrates an example relationship matrix following alignment user interaction, according to some embodiments of the present disclosure.

FIG. 3E illustrates the relationship matrix 300 following the alignment user interaction of FIG. 3D. For example, the first label of the X axis 304 is "Thursday" in FIG. 3E, which is different from the first label of the X axis 304, "Sunday," of FIG. 3D. The position and/or location of the relationship blocks of the relationship matrix may also update corresponding to the alignment of the grid. For example, relationship block 320C, which may have been positioned at the edge of the grid in FIG. 3D, may be re-positioned as illustrated by FIG. 3E based on the alignment interaction. The alignment motion and/or interaction from starting point 334A to 334B may correspond to at least three relationship block widths and/or distances. As a result, relationship block 320C and/or the corresponding label on the Y axis 304 may move and/or update at least three relationship block widths and/or distances as illustrated by FIGS. 3D and 3E.

In some embodiments, there may be variations and/or additional user interactions to align and/or realign the relationship matrix. For example, a vertical user interaction, similar to the interaction illustrated by FIG. 3C, may cause the relationship matrix to realign along the Y axis. In some embodiments, the speed and/or time between a vertical user interaction (e.g., the time between user interaction at points 332A and 332B of FIG. 3C) may differentiate and/or distinguish between a time and/or unit period change of FIG. 3C and an alignment change as illustrated by FIGS. 3D and 3E. For example, there may be a time threshold (e.g., five hundred milliseconds), where a faster movement causes a time and/or unit period change and a slower movement causes a realignment of the grid.

Figure 3F:
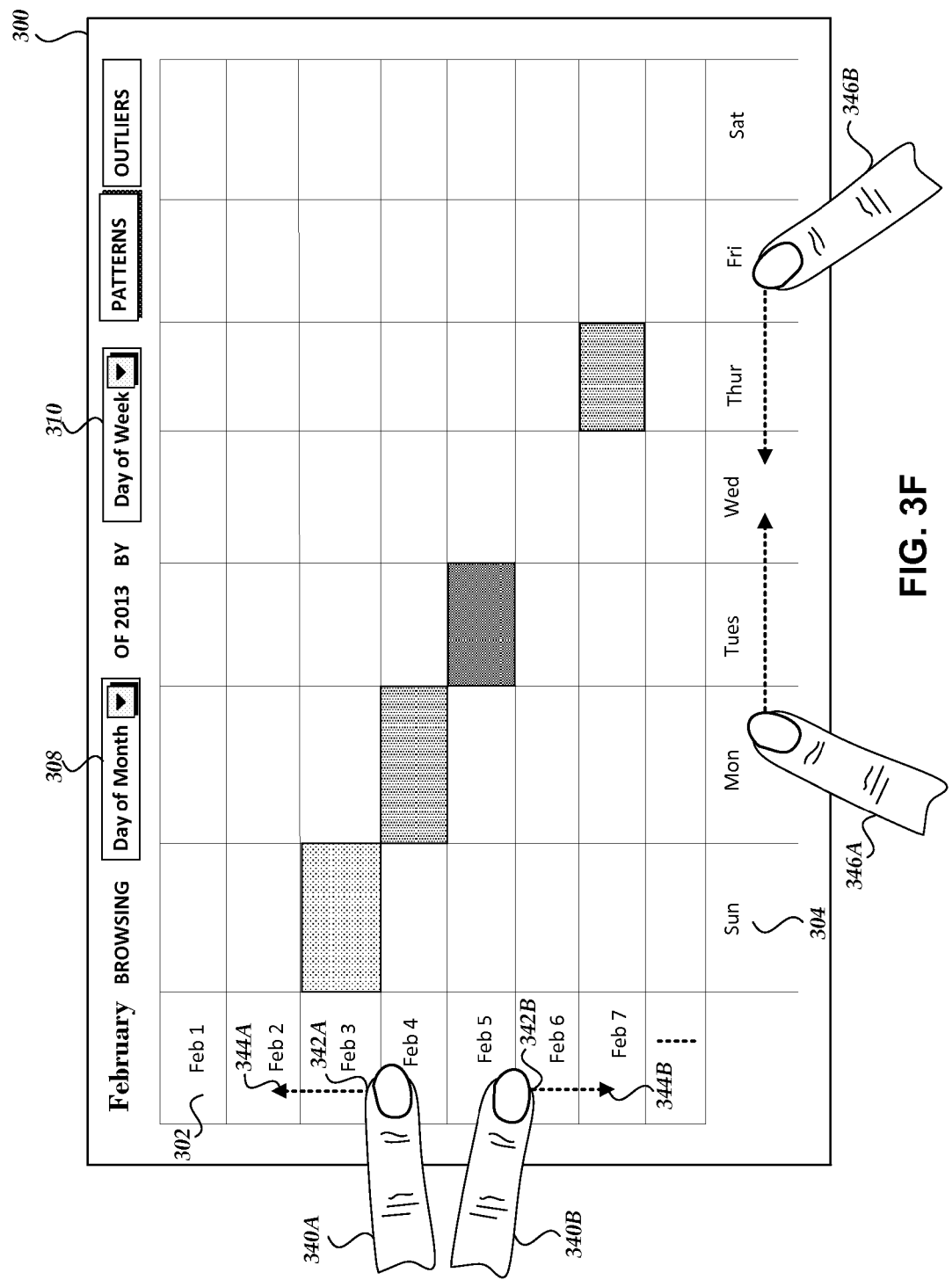
FIG. 3F illustrates an example relationship matrix configured to update the units of an axis, according to some embodiments of the present disclosure.

FIG. 3F illustrates an example relationship matrix configured to update the units of an axis based on user interaction. For example, the human operator may place fingers 340A and 340B or any other input mechanism at starting points 342A and 342B, respectively, along the Y axis 302. The human operator may then move and/or drag fingers 340A and 340B or any other input mechanism to ending points 344A and 344B, respectively. As a result of the illustrated "zooming in" motion, the human operator may change and/or update the units of the Y axis. For example, the zooming in user interaction may update the Y axis unit of "Day of Month" to "Day of Week" or "Hour of Day." The relationship matrix system may update the units of an axis following user interaction input based on the other axis that wasn't changed. For example, since the X axis of the relationship matrix 300 of FIG. 3F may be "Day of Week," the relationship matrix system may update the Y axis to "Hour of Day" to avoid the same units for both axes following user interaction input. Similar to the user interaction with fingers 340, a human operator may perform a "zooming out" action as illustrated by fingers 346A and 346B and their corresponding directional arrows along the X axis 304. The zooming out action may change and/or update the units of the X axis 304 (e.g., the X axis unit of "Day of Week" may update to "Day of Month.") Similar to some of the illustrated user interactions in this disclosure, a zooming in and/or zooming out interaction may update the relationship blocks displayed in relationship matrix 300, the Y axis selector 308, the X axis selector 310, and/or other elements of the relationship matrix 300 accordingly.

In some embodiments, there may be some variations of updating the units of an axis of the relationship matrix. In some embodiments, the relative distance of a zooming in and/or zooming out interaction may cause different updates. For example, the zooming in action illustrated by fingers 346 may cause the X axis units to change to "Day of Month," "Week of Month," and/or "Month of Year" based on the relative distance dragged and/or indicated. In some embodiments, a zooming in and/or zooming out user interaction may cause the relationship matrix 300 to update automatically. For example, as a human operator drags their fingers 346 the Y axis may update to "Day of Month," "Week of Month," and "Month of Year" (in that order) corresponding to the greater and/or longer distance that their fingers 346A. Additionally, the relationship blocks shown in the relationship matrix may update automatically as the units of one or more of the axes change.

In some embodiments, the zooming in and/or zooming out actions may be configured for different results. For example, the results of actions by fingers 340 and 346 that were previously described may be reversed.

Figure 3G:
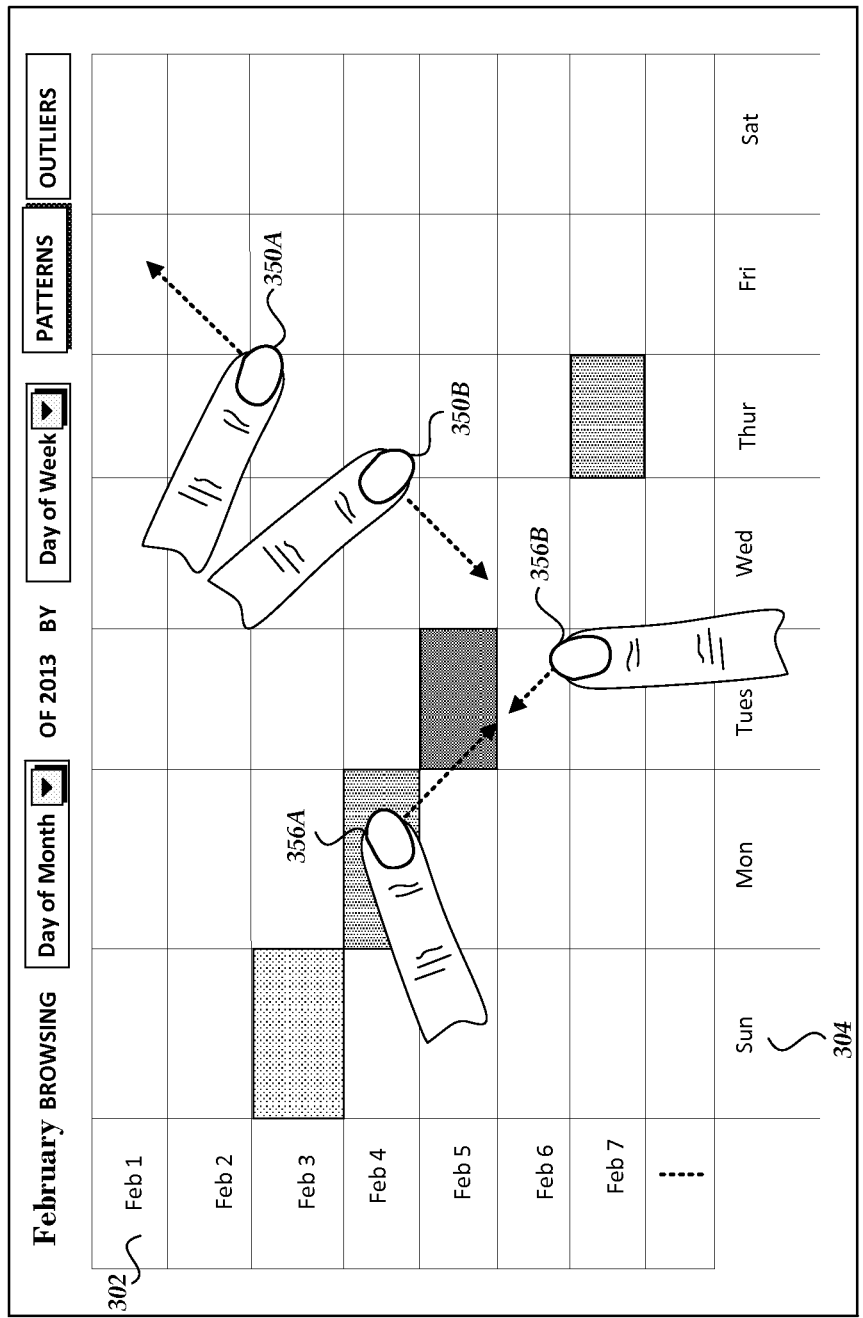
FIG. 3G illustrates an example relationship matrix configured to update the units of both axes, according to some embodiments of the present disclosure.

FIG. 3G illustrates an example relationship matrix configured to update the units of both axes simultaneously based on user interaction. The user interaction illustrated by fingers 350 (including finger 350A and/or finger 350B) and their directional arrows may be similar to the zooming in action illustrated by fingers 340 of FIG. 3F. However, one difference between FIGS. 3F and 3G may be the placement of fingers 350 on the grid of relationship matrix 300 instead of the placement of fingers on an axis. Similar to the user interaction of fingers 340 of FIG. 3F, which may have updated one axis, the zooming in action of fingers 350 may cause both axes to update simultaneously. For example, both the Y axis 302 units and the X axis 304 units may change to "Day of Week" and "Hour of Day," respectively. Similarly, the zooming out and/or pinching motion of fingers 356 may cause both axes to update simultaneously (e.g., the Y axis 302 units and X axis 304 units may change to "Week of Month" and "Day of Month," respectively.)

In some embodiments, the variations of interactions illustrated by FIG. 3F may be available for the zooming in and/or out interactions illustrated by FIG. 3G. For example, the relative distance of the user interaction may impact and/or affect the change in the units of the axes. In some embodiments, while the directional arrows of FIG. 3G are shown at a diagonal, the relative orientation of the zooming in and/or zooming out actions do not matter. For example, the direction of the interactions by the fingers and/or other input mechanisms may be horizontal or vertical.

Outliers View

Figure 4:
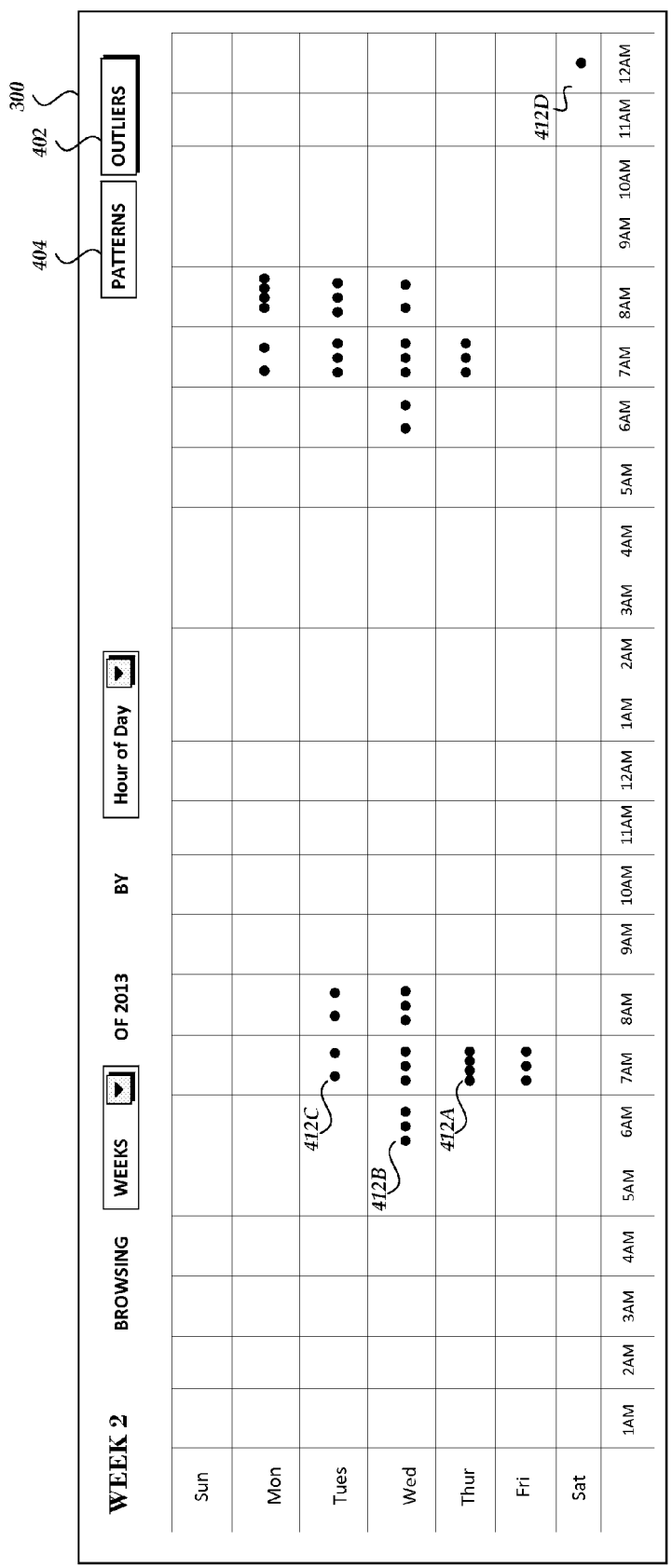
FIG. 4 illustrates an example relationship matrix configured to display an outliers view, according to some embodiments of the present disclosure.

Certain of the relationship matrices illustrated herein may be configured to display a "patterns" or "outlier" view. The relationship matrix 300 of FIG. 3 displays a "patterns" view, while the user interface of FIG. 4 illustrates an example of an "outliers" view. The patterns view may comprise displaying relationships with gradient, color, hue, and/or saturation. In contrast, the outliers view shown in the relationship matrix 300 of FIG. 4 may comprise displaying relationships through one or more dots, visual indicators, and/or binary visualizations. Similar to the relationship blocks 312 of FIG. 3A, relationship blocks 412 (including blocks 412A, 412B, 412C, and/or 412D) may represent relationships between the axes. For example, the relationship block 412A may indicate multiple meetings and/or events at the intersection of "Thursday" and "7 AM" for the second week of 2013. Additionally, the relative number of dots of relationship blocks may further indicate information. For example, block 412A may comprise more dots and/or visual indicators than block 412B (which may be similar to the relative gradient, color, hue, and/or saturation of relationship blocks 312 of FIG. 3A). In the example, a greater number of dots and/or visual indicators may represent a greater number of objects and/or events at a particular intersection.

There may be advantages and/or benefits of the outliers view of a relationship matrix, such as, but not limited to, accelerating and/or facilitating human recognition of outlier relationships. In some of the previous examples, since the relationship matrix 300 of FIG. 3 may use a patterns view, a relationship may be difficult for a human to recognize based on relative gradient, color, hue, and/or saturation. For example, the relationship block of 312D of FIG. 3A may be difficult for a human operator to visually recognize because the gradient, color, hue, and/or saturation may be very light and/or difficult to see on a computer monitor and/or display. The particular viewing device and/or monitor being used may affect the ability to view pattern visualizations. Therefore, with a binary relationship, dot, and/or black/white visual indicators, an outlier may be quickly recognized by a human operator. For example, relationship block 412D may comprise a single black dot, which may be easily recognized by a human operator.

In some embodiments, the relationship matrix may be configured to receive user interaction input to switch between a patterns and outliers view. For example, the relationship matrix 300 may comprise an outliers button 402 and a patterns button 404. A human operator may toggle between the outliers view illustrated by FIG. 4 and the patterns view illustrated by FIG. 3A by pressing, touching, and/or clicking the outliers button 402 and the patterns button 404, respectively. The relationship matrix 300 may display the same relationship objects (e.g., meeting and/or event objects) but with a different view and/or representation of the relationship objects.

In some embodiments, the user interactions illustrated for the relationship matrix of FIG. 3 may be available for the relationship matrix of FIG. 4.

In some embodiments, there may be variations of the formulas to configure the display of the one or more dots, visual indicators, and/or binary visualizations. The number of objects to be displayed as visual indicators may be calculated by various formulas, such as, but not limited to, linear, exponential, logarithmic, any other type of equation, and/or some combination thereof. For example:

D—Dots.
O—Objects.

$$D_1 = \text{CEILING}\left(\frac{O}{10}\right)$$

In some embodiments, which use the $D_1$ formula, if the number of objects to be displayed at a relationship block is twenty-five, three dots may be displayed. Using the same formula, if there are five objects, one dot may be displayed. Another example formula is the following:

$$D_2 = \text{CEILING}(\sqrt{O})$$

In some embodiments, using the $D_2$ formula, if the number of objects to be displayed at a relationship block is twenty-five, five dots may be displayed. Using the same formula, if there are five hundred objects, twenty-three dots may be displayed.

In some embodiments, there may be some variations of the display of the relationship blocks illustrated as dots of FIG. 4 and/or gradient, color, hue, and/or saturation of FIG. 3. The dots, gradient, color, hue, and/or saturation may be configurable by the human operator. For example, a human operator may select various hues of the color green or red to be displayed in the relationship blocks of FIG. 3. In other examples, a human operator may select different shapes instead of dots for the outliers view of FIG. 4. In some embodiments, positive and/or negative numbers may be displayed by different colors. For example, positive representations of objects as relationship blocks may be blue and/or negative representations of objects as relationship blocks may be red.

In some embodiments, the formulas and/or similar formulas for calculating outliers view representations may be used to determine representations of gradient, hue, color, and/or saturation in the patterns view.

Other Types of Relationship Matrices

While some example relationship matrices of the present disclosure comprise time matrices, there may be other types of relationship matrices. In some embodiments, relationship matrices may be generated and/or accelerated where one or more axes of the relationship matrices comprises units that are hierarchical, scalar, classifications, and/or otherwise logically related and/or grouped. For example, in a time matrix, one or more axes may comprise time units such as, but not limited to, "Month of Year," "Week of Month," "Day of Month," "Day of Week," "Hour of Day." Time units may be hierarchical because months comprise a year, days comprise a month, hours comprise a day, and so forth. In some embodiments, an axis of a relationship matrix may comprise geographical units. For example the geographical units of an axis may be the following: "Country," "State," "City," "Zip Code," and/or "Street." Similar to the hierarchy of time units, states may comprise a country, cities may comprise a state, a city may be comprised of zip codes, and so forth. A relationship matrix and the units of the axes of a relationship matrix may be highly configurable because it may be based on a data object model and/or ontology, which may correspond to the systems, methods, and/or techniques disclosed in the Ontology reference.

Implementation Mechanisms

The various computing device(s) discussed herein, such as the relationship matrix system 100 of FIG. 1, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The relationship matrix system 100 may be hosted and/or executed on one or more computing devices with one or more hardware processors and with any of the previously mentioned operating system software.

Figure 6:
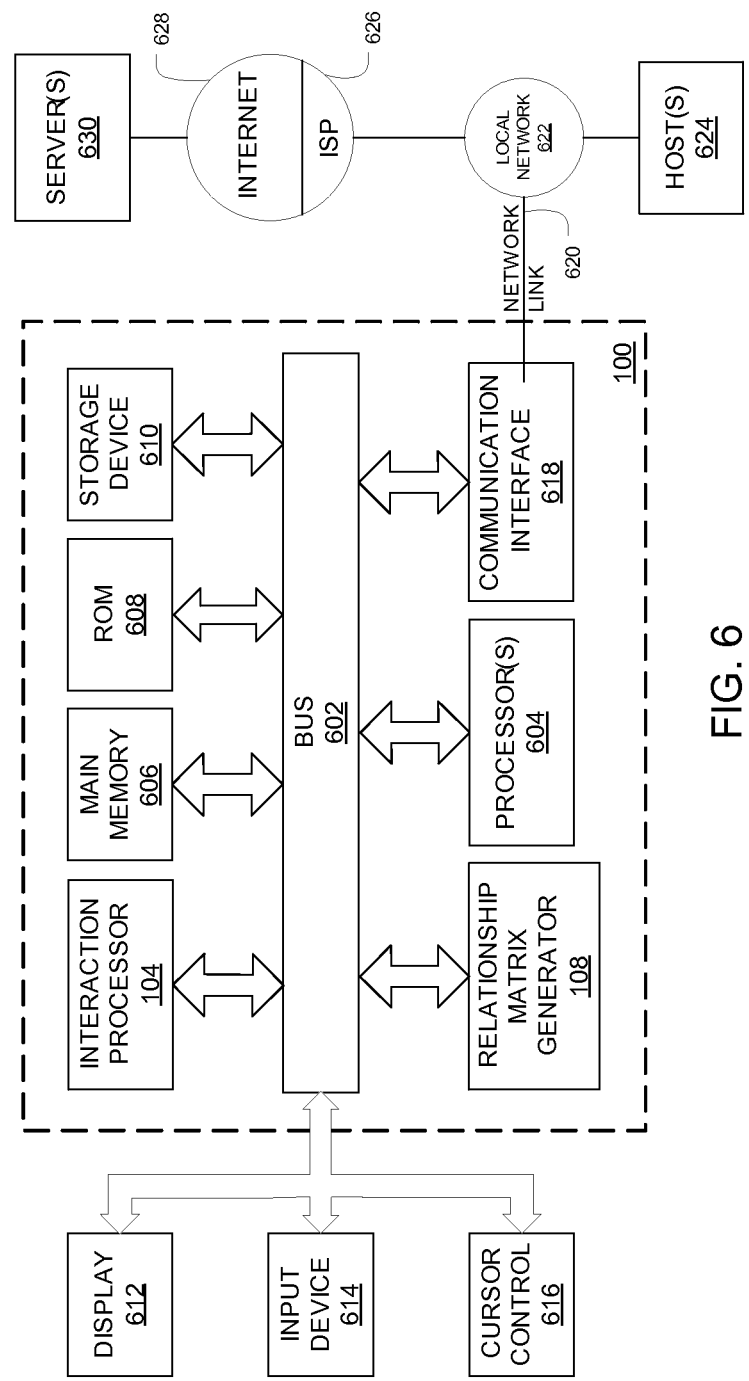
FIG. 6 is a block diagram illustrating an example relationship matrix system with which various methods and systems discussed herein may be implemented.

FIG. 6 is a block diagram that illustrates example components of the relationship matrix system 100. While FIG. 6 refers to the relationship matrix system 100, any of the other computing devices discussed herein may have some or all of the same or similar components.

The relationship matrix system 100 may execute software, e.g., standalone software applications, applications within browsers, network applications, etc., whether by the particular application, the operating system, or otherwise. Any of the systems discussed herein may be performed by the relationship matrix system 100 and/or a similar computing system having some or all of the components discussed with reference to FIG. 6.

The relationship matrix system 100 includes a bus 602 or other communication mechanism for communicating information, and a hardware processor, or multiple processors, 604 coupled with bus 602 for processing information. Hardware processor(s) 604 may be, for example, one or more general purpose microprocessors.

The relationship matrix system 100 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render the relationship matrix system 100 into a special-purpose machine that is customized to perform the operations specified in the instructions. Such instructions, as executed by hardware processors, may implement the methods and systems described herein for sharing security information.

The relationship matrix system 100 further includes a read only memory (ROM) 608 or other static storage device coupled to bus 602 for storing static information and instructions for processor(s) 604. A storage device 610, such as a magnetic disk, optical disk, or USB thumb drive (Flash drive), etc., is provided and coupled to bus 602 for storing information and instructions. The object storage device 130 of FIG. 1 may be stored on the main memory 606 and/or the storage device 610.

In some embodiments, the object storage device 130 of FIG. 1 is a file system, relational database such as, but not limited to, MySql, Oracle, Sybase, or DB2, and/or a distributed in memory caching system such as, but not limited to, Memcache, Memcached, or Java Caching System, and/or some combination thereof.

The relationship matrix system 100 may be coupled via bus 602 to a display 612, such as a cathode ray tube (CRT) or LCD display or touch screen, for displaying information to a computer user. An input device 614 is coupled to bus 602 for communicating information and command selections to processor 604. One type of input device 614 is a keyboard including alphanumeric and other keys. Another type of input device 614 is a touch screen. Another type of user input device is cursor control 616, such as a mouse, a trackball, a touch screen, or cursor direction keys for communicating direction information and command selections to processor 604 and for controlling cursor movement on display 612. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The relationship matrix system 100 may include a user interface unit to implement a GUI, for example, FIGS. 3, 4, and/or 5, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The relationship matrix system 100 and/or the relationship matrix 300 of FIG. 1 may be configured to be compatible with web browsers such as, but not limited to, Firefox, Internet Explorer, Safari, and/or Chrome.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. Certain web programming methods may be used such as AJAX. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The relationship matrix system 100, or components of it, such as the interaction processor 104 and/or the relationship matrix generator 108 of FIG. 1 and/or FIG. 6, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor(s) 604 for execution. For example, the instructions may initially be carried on a magnetic disk or solid state drive of a remote computer. The remote computer may load the instructions into its dynamic memory and send the instructions over a telephone or cable line using a modem. A modem local to the relationship matrix system 100 may receive the data on the telephone or cable line and use an infra-red transmitter to convert the data to an infra-red signal. An infra-red detector can receive the data carried in the infra-red signal and appropriate circuitry can place the data on bus 602. Bus 602 carries the data to main memory 606, from which the processor(s) 604 retrieves and executes the instructions. The instructions received by main memory 606 may retrieve and execute the instructions. The instructions received by main memory 606 may optionally be stored on storage device 610 either before or after execution by processor(s) 604.

The relationship matrix system 100 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to be communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from the relationship matrix system 100, are example forms of transmission media.

A network, such as the network 160 of FIG. 1, may comprise, but is not limited to, one or more local area networks, wide area network, wireless local area network, wireless wide area network, the Internet, or any combination thereof.

The relationship matrix system 100 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor(s) 604 as it is received, and/or stored in storage device 610, or other non-volatile storage for later execution.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system for providing relationship visualizations, the computer system comprising:
   an object storage device storing information regarding a plurality of objects and properties of respective objects; and
   one or more hardware processors programmed, via executable code instructions, to:
     receive, from a user of the computer system, selection of a plurality of objects;
     determine, based on input from the user or default settings, an action associated with the plurality of objects to include in a visualization;
     identify, in the object storage device, a plurality of the determined actions associated with respective objects;
     determine a first time unit associated with each of a plurality of sections of a first axis;
     determine a second time unit associated with each of a plurality of sections of a second axis, wherein the first time unit comprises a plurality of the second time units and each section of the first axis intersects with a plurality of sections of the second axis;
     assigning respective first time periods to each of the sections of the first axis based on the determined first time unit and respective second time periods to each of the section of the second axis based on the determined second time unit;
     for each identified action associated with respective objects:
       determine, based on one or more properties of the respective object stored in the object storage device, an action time associated with the identified action;

determine a first time period that includes the action time;

determine a second time period that includes the action time; and incrementing a count of actions associated with the determined first time period and the determined second time period;

generate user interface data configured to display the visualization including:

indicators of the first time periods on respective sections of the first axis;

indicators of the second time periods on respective sections of the second axis; and indicators at intersections of first time periods and second time periods, the indicators at the intersections corresponding to respective counts of actions associated with the respective first time period and second time period, and the indicators at the intersections configured to be presented through at least one of color, gradient, hue, saturation, or binary visualization.

2. The system of claim 1, wherein the one or more hardware processors is further programmed, via executable code instructions, to:

receive, from a user of the computer system, user interface input data via touch screen input.

3. The system of claim 1, wherein the one or more hardware processors is further programmed, via executable code instructions, to:

receive, from a user of the computer system, user interface input data associated with modifying the first time unit and/or the second time unit; and update the user interface data configured to display the visualization based on the modified first time unit and/or second time unit.

4. The system of claim 1, wherein the one or more hardware processors is further programmed, via executable code instructions, to:

receive, from a user of the computer system, user interface input data associated with modifying the first time period and/or the second time period; and update the user interface data configured to display the visualization based on the modified first time period and/or second time period.

5. The system of claim 4, wherein receipt of the user interface input data associated with modifying the first time period and/or the second time period is via touch screen input.

6. The system of claim 1, wherein the one or more hardware processors is further programmed, via executable code instructions, to:

receive, from a user of the computer system, user interface input data associated with removing one or more of the first time periods from a first side of the first axis and adding one or more additional first time periods on a second side of the first axis opposite the first side; and update the user interface data configured to display the visualization based on the received user interface input data.

7. The system of claim 1, wherein the indicators at the intersections are configurable to be different shapes.

8. The system of claim 7, wherein a shape of the different shapes comprises a dot.

9. A method for providing relationship visualizations, the method comprising:

receiving, from a user of a computer system comprising a hardware computer processor, selection of a plurality of objects;

determining, based on input from the user or default settings, an action associated with the plurality of objects to include in a visualization;

identifying, by the computer system, a plurality of the determined actions associated with respective objects;

determining, by the computer system, a first time unit associated with each of a plurality of sections of a first axis;

determining, by the computer system, a second time unit associated with each of a plurality of sections of a second axis, wherein the first time unit comprises a plurality of the second time units and each section of the first axis intersects with a plurality of sections of the second axis;

assigning, by the computer system, respective first time periods to each of the sections of the first axis based on the determined first time unit and respective second time periods to each of the section of the second axis based on the determined second time unit;

for each identified action associated with respective objects, by the computer system:

determining, based on one or more properties of the respective object, an action time associated with the identified action;

determining a first time period that includes the action time;

determining a second time period that includes the action time; and incrementing a count of actions associated with the determined first time period and the determined second time period;

generating user interface data configured to display the visualization including:

indicators of the first time periods on respective sections of the first axis;

indicators of the second time periods on respective sections of the second axis; and indicators at intersections of first time periods and second time periods, the indicators at the intersections corresponding to respective counts of actions associated with the respective first time period and second time period, and the indicators at the intersections configured to be presented through at least one of color, gradient, hue, saturation, or binary visualization.

10. The method of claim 9, further comprising:

receiving, from the user of the computer system, user interface input data via touch screen input.

11. The method of claim 9, further comprising:

receiving, from the user of the computer system, user interface input data associated with modifying the first time unit and/or the second time unit; and updating the user interface data configured to display the visualization based on the modified first time unit and/or second time unit.

12. The method of claim 9, further comprising:

receiving, from the user of the computer system, user interface input data associated with modifying the first time period and/or the second time period; and updating the user interface data configured to display the visualization based on the modified first time period and/or second time period.

13. The method of claim 9, further comprising:
receiving, from the user of the computer system, user interface input data associated with removing one or more of the first time periods from a first side of the first axis and adding one or more additional first time periods on a second side of the first axis opposite the first side; and
updating, by the computer system, the user interface data configured to display the visualization based on the received user interface input data.

14. The method of claim 9, wherein the indicators at the intersections are configurable to be different shapes.

15. The method of claim 14, wherein a shape of the different shapes comprises a dot.

16. Non-transitory computer storage comprising instructions for causing a computer system to provide relationship visualizations by:
receiving, from a user of the computer system, selection of a plurality of objects;
determining, based on input from the user or default settings, an action associated with the plurality of objects to include in a visualization;
identifying a plurality of the determined actions associated with respective objects;
determining a first time unit associated with each of a plurality of sections of a first axis;
determining a second time unit associated with each of a plurality of sections of a second axis, wherein the first time unit comprises a plurality of the second time units and each section of the first axis intersects with a plurality of sections of the second axis;
assigning respective first time periods to each of the sections of the first axis based on the determined first time unit and respective second time periods to each of the section of the second axis based on the determined second time unit;
for each identified action associated with respective objects:
determining, based on one or more properties of the respective object, an action time associated with the identified action;
determining a first time period that includes the action time;
determining a second time period that includes the action time; and
incrementing a count of actions associated with the determined first time period and the determined second time period;
generating user interface data configured to display the visualization including:
indicators of the first time periods on respective sections of the first axis;
indicators of the second time periods on respective sections of the second axis; and
indicators at intersections of first time periods and second time periods, the indicators at the intersections corresponding to respective counts of actions associated with the respective first time period and second time period, and the indicators at the intersections configured to be presented through at least one of color, gradient, hue, saturation, or binary visualization.

17. The non-transitory computer storage of claim 16, wherein the instructions further cause the computing system to:
receive user interface input data via touch screen input.

18. The non-transitory computer storage of claim 16, wherein the instructions cause the computer system to:
receive user interface input data associated with modifying the first time unit and/or the second time unit; and
update the user interface data configured to display the visualization based on the modified first time unit and/or second time unit.

19. The non-transitory computer storage of claim 16, wherein the instructions further cause the computer system to:
receive user interface input data associated with modifying the first time period and/or the second time period; and
update the user interface data configured to display the visualization based on the modified first time period and/or second time period.

20. The non-transitory computer storage of claim 16, wherein the instructions further cause the computer system to:
receive user interface input data associated with removing one or more of the first time periods from a first side of the first axis and adding one or more additional first time periods on a second side of the first axis opposite the first side; and
update the user interface data configured to display the visualization based on the received user interface input data.

* * * * *